(12) United States Patent
Ramsey et al.

(10) Patent No.: US 11,451,100 B2
(45) Date of Patent: Sep. 20, 2022

(54) ELECTRIC MOTOR FOR HYBRID MODULE

(71) Applicant: Schaeffler Technologies AG & Co. KG, Herzogenaurach (DE)

(72) Inventors: John Ramsey, Mansfield, OH (US); Matthew Payne, Glenmont, OH (US); Gregory Gress, Wooster, OH (US); Tuo Luo, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 95 days.

(21) Appl. No.: 17/068,094

(22) Filed: Oct. 12, 2020

(65) Prior Publication Data

US 2021/0126497 A1 Apr. 29, 2021

Related U.S. Application Data

(60) Provisional application No. 62/925,018, filed on Oct. 23, 2019.

(51) Int. Cl.
*H02K 1/22* (2006.01)
*H02K 16/00* (2006.01)
*H02K 1/18* (2006.01)
*H02K 7/00* (2006.01)
*B60K 6/26* (2007.10)
*H02K 5/16* (2006.01)

(52) U.S. Cl.
CPC ............... *H02K 1/22* (2013.01); *H02K 1/18* (2013.01); *H02K 16/00* (2013.01); *B60K 6/26* (2013.01); *B60K 2006/264* (2013.01); *H02K 5/16* (2013.01); *H02K 7/006* (2013.01)

(58) Field of Classification Search
CPC ........ H02K 1/22; H02K 1/2706; H02K 9/197; H02K 16/00
See application file for complete search history.

(56) References Cited

U.S. PATENT DOCUMENTS

| | | | |
|---|---|---|---|
| 1,192,404 A | * 7/1916 | Ewart | H02K 1/28 |
| | | | 29/520 |
| 9,140,311 B2 | * 9/2015 | Iwase | B60L 15/2054 |
| 2019/0190334 A1 | 6/2019 | Payne et al. | |

* cited by examiner

*Primary Examiner* — Dang D Le

(57) ABSTRACT

A rotor for an electric motor includes an axis, a rotor carrier a plurality of rotor segments, a first end plate, a second end plate, and a spring element. The rotor carrier has a tubular portion with a cylindrical surface and a radial wall extending radially outwardly from the cylindrical surface. The plurality of rotor segments circumscribe the cylindrical surface. The first end plate is disposed at a first axial end of the plurality of rotor segments adjacent to the radial wall. The second end plate is disposed at a second axial end of the plurality of rotor segments. The spring element presses the first end plate, the plurality of rotor segments, and the second end plate against the radial wall. The spring element includes a ring portion and a plurality of segments extending axially from the ring portion.

19 Claims, 2 Drawing Sheets

ELECTRIC MOTOR FOR HYBRID MODULE

TECHNICAL FIELD

The present disclosure relates generally to an electric motor, and more specifically to an electric motor for a hybrid module.

BACKGROUND

Electric motors for hybrid modules are known. One example is shown in commonly-assigned U.S. Patent Application Publication No. 2019/0190334 titled HYBRID MODULE INCLUDING MOTOR ROTOR CLAMP RING STAKED TO ROTOR HUB, hereby incorporated by reference as if set forth fully herein.

SUMMARY

Example embodiments broadly comprise a rotor for an electric motor including an axis, a rotor carrier a plurality of rotor segments, a first end plate, a second end plate, and a spring element. The rotor carrier has a tubular portion with a cylindrical surface and a radial wall extending radially outwardly from the cylindrical surface. The plurality of rotor segments circumscribe the cylindrical surface. The first end plate is disposed at a first axial end of the plurality of rotor segments adjacent to the radial wall. The second end plate is disposed at a second axial end of the plurality of rotor segments. The spring element presses the first end plate, the plurality of rotor segments, and the second end plate against the radial wall. The spring element includes a ring portion and a plurality of segments extending axially from the ring portion.

In an example embodiment, the spring element contacts the second end plate. In an example embodiment, the rotor carrier has a notch and each of the plurality of segments has a hook end installed in the notch. In an example embodiment, the tubular portion has a circumferential groove and each of the plurality of segments is clipped into the circumferential groove. In an example embodiment, at least a portion of each of the plurality of segments is disposed radially inside of the tubular portion. In an example embodiment, the spring element has a notch and the second end plate has an axial protrusion extending into the notch.

In some example embodiments, the rotor carrier has an annular ring extending radially inwardly from the tubular portion. In an example embodiment, the rotor includes a resolver rotor fixed to the rotor carrier on a first axial side of the annular ring. The spring element is installed on a second axial side of the annular ring, opposite the first axial side. In some example embodiments, the rotor includes a shaft arranged to transmit a torque from a combustion engine to a torque converter, and a flange fixed to the annular ring and to the shaft. In an example embodiment, the shaft has a first spline for mating engagement with a damper flange and a second spline for mating engagement with a torque converter drive plate.

Other example embodiments broadly comprise a hybrid module including a housing, the rotor, and a stator. The housing has a first portion arranged for fixing to a transmission case and a second portion arranged for fixing to an internal combustion engine. The stator is fixed to the housing and circumscribes the rotor segments. In an example embodiment, the first portion is bolted to the second portion. In an example embodiment, the hybrid module includes a resolver rotor fixed to the rotor carrier, and a resolver stator fixed to the housing. In an example embodiment, the hybrid module includes a torque converter with a pilot fixed to a cover shell. The shaft has a bore and the pilot is installed in the bore.

In some example embodiments, the hybrid module includes a first bearing arranged on a first axial side of the flange radially between the first portion and the shaft, and a second bearing arranged on a second axial side of the flange, opposite the first axial side, radially between the second portion and the shaft. In an example embodiment, the hybrid module includes a first seal arranged on the first axial side of the flange radially between the first portion and the shaft, and a second seal arranged on the second axial side of the flange radially between the second portion and the shaft.

In some example embodiments, the hybrid module includes a torque converter drive plate with a hub flange drivingly engaged with the shaft, and a connector plate fixed to the hub flange and including a first conical bolting flange. In an example embodiment, the hybrid module includes a snap ring. The shaft has a groove and the snap ring is installed in the groove for axially retaining the hub flange on the shaft. In some example embodiments, the hybrid module includes a torque converter with a drive plate fixed to a cover shell, and an adapter plate bolted to the drive plate and to the connector plate. In an example embodiment, the adapter plate is bolted to the drive plate with a plurality of circumferentially spaced bolts, the adapter plate has a second conical bolting flange aligned with the first conical bolting flange, and the connector plate has a plurality of apertures aligned with the plurality of circumferentially spaced bolts.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
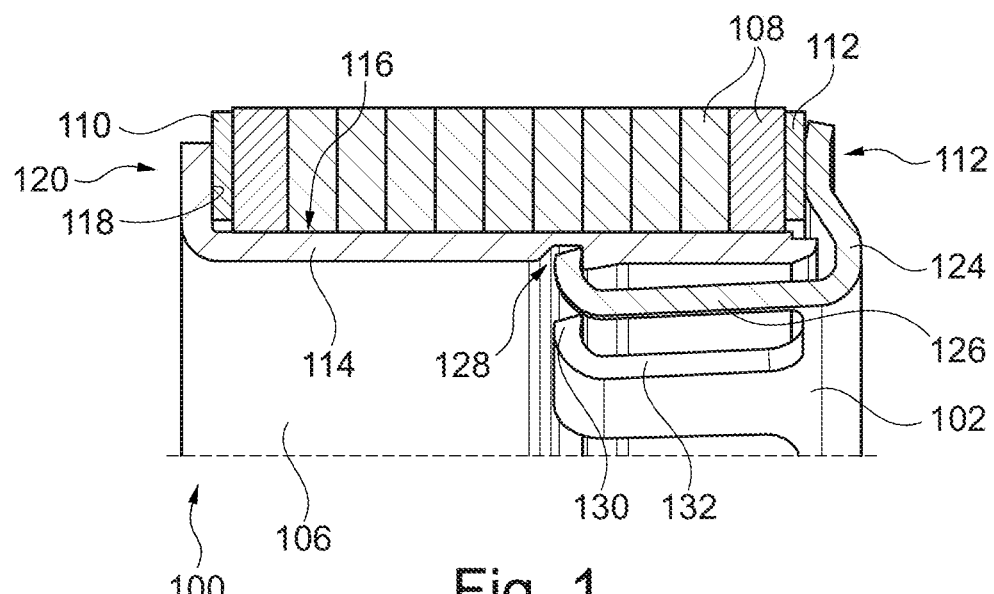
FIG. 1 illustrates a cross sectional view of a portion of a rotor according to an example embodiment.
Figure 2:
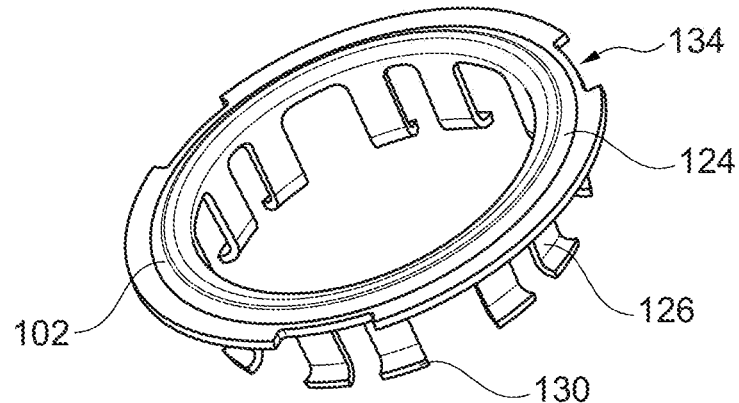
FIG. 2 illustrates a perspective view of a spring element of the rotor of FIG. 1.
Figure 4:
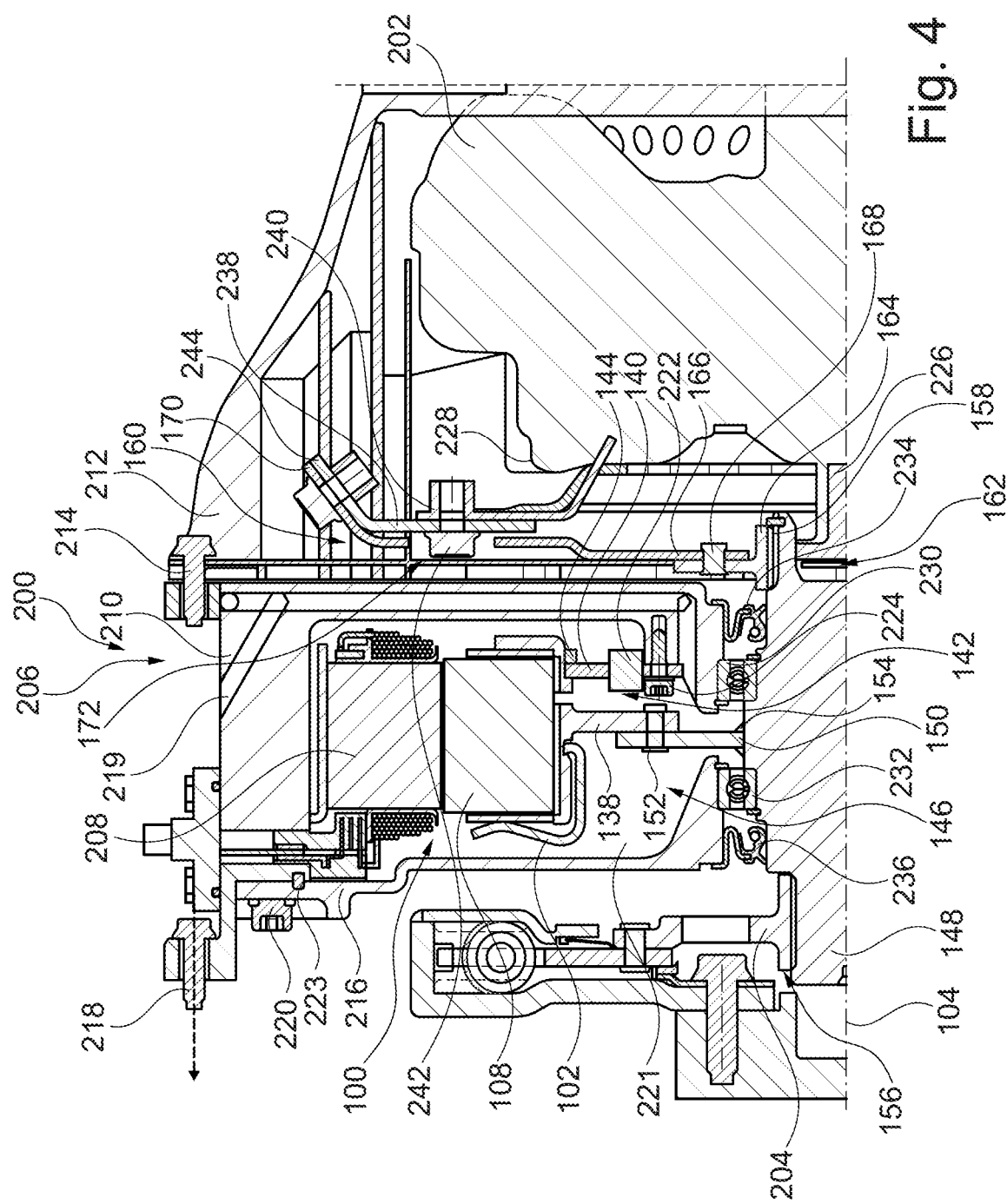
FIG. 4 illustrates a top half cross-sectional view of a hybrid module including the rotor of FIG. 1.

The following description is made with reference to FIGS. 1-2. FIG. 1 illustrates a cross sectional view of a portion of rotor 100. FIG. 2 illustrates a perspective view of spring element 102 of rotor 100 of FIG. 1. Rotor 100 includes axis 104 (ref. FIG. 4), rotor carrier 106, rotor segments 108, end plate 110, end plate 112, and spring element 102. Rotor carrier 106 includes tubular portion 114 with cylindrical surface 116, and radial wall 118 extending radially outwardly from the cylindrical surface. Rotor segments 108 circumscribe cylindrical surface 116. End plate 110 is disposed at axial end 120 of the rotor segments adjacent to the radial wall. End plate 112 is disposed at axial end 122 of the rotor segments. Spring element 102 presses end plate 110, rotor segments 108, and end plate 112 against radial wall 118.

Spring element 102 includes ring portion 124 and segments 126 extending axially from the ring portion. Spring element 102 contacts end plate 112. Rotor carrier 106 includes notch 128 and each of segments 126 has a hook end 130 installed in the notch. Otherwise stated, tubular portion 114 includes circumferential groove 128 and each of segments 126 is clipped into the circumferential groove. Portion 132 of each of the segments is disposed radially inside of tubular portion 114.

Figure 3:
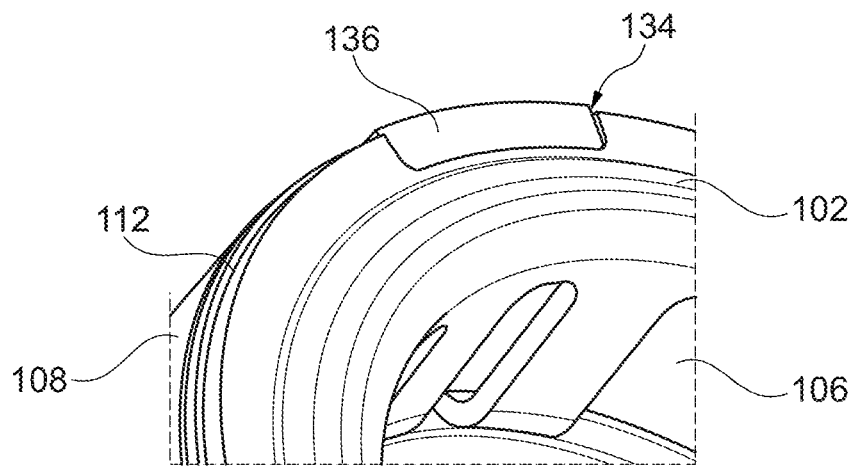
FIG. 3 illustrates a partial perspective view of a portion of the rotor of FIG. 1.

The following description is made with reference to FIGS. 1-3. FIG. 3 illustrates a partial perspective view of a portion of rotor 100 of FIG. 1. Spring element 102 includes notch 134 and end plate 112 includes axial protrusion 136 extending into the notch.

The following description is made with reference to FIGS. 1-4. FIG. 4 illustrates a top half cross-sectional view of hybrid module 200 including rotor 100 of FIG. 1. Rotor carrier 106 includes annular ring 138 extending radially inwardly from tubular portion 114. Rotor 100 includes resolver rotor 140 fixed to rotor carrier 106 on axial side 142 of the annular ring. Resolver rotor 140 is retained by clamping ring 144. Clamping ring 144 may be press fit, staked, welded, or fixed to the rotor carrier by another method to frictionally clamp the resolver rotor to the rotor carrier. Spring element 102 is installed on axial side 146 of the annular ring, opposite axial side 142.

Rotor 100 includes shaft 148 arranged to transmit torque from a combustion engine (not shown) to torque converter 202, and flange 150. Flange 150 is fixed to annular ring 138 by rivet 152, and to shaft 148 by weld 154. Shaft 148 includes spline 156 for mating engagement with damper flange 204, and spline 158 for mating engagement with torque converter drive plate 160.

Hybrid module 200 includes housing 206, rotor 100, and stator 208 fixed to the housing and circumscribing the rotor segments. Housing 206 includes portion 210 arranged for fixing to transmission case 212 (via bolt 214), and portion 216 arranged for fixing to an internal combustion engine (not shown) (via bolt 218). Portion 210 includes flow passages 219 for introducing a cooling fluid to sealed chamber 221 for cooling rotor 100 and stator 208. Portion 210 is bolted to portion 216 by bolts 220 and sealed to portion 216 by seal 223. As discussed above, resolver rotor 140 is fixed to rotor carrier 106. Resolver stator 222 is fixed to housing 206 by bolt 224. Hybrid module 200 includes torque converter 202 with pilot 226 fixed to cover shell 228. Shaft 148 includes bore 162. Pilot 226 is installed in bore 162.

Hybrid module 200 includes bearing 230 and bearing 232. Bearing 230 is arranged on axial side 142 of flange 150, radially between portion 210 and shaft 148. Bearing 232 is arranged on axial side 146 of flange 150, opposite axial side 142, radially between portion 216 and shaft 148. Hybrid module also includes seals 234 and 236. Seal 234 is arranged on axial side 142 of flange 150, radially between portion 210 and shaft 148. Seal 236 is arranged on axial side 146 of flange 150, opposite axial side 142, radially between portion 216 and shaft 148. Seals 223, 234, and 236 cooperate to keep cooling fluid in sealed chamber 221 from leaking outside of the hybrid module.

Hybrid module 200 includes torque converter drive plate 160 including hub flange 164 drivingly engaged with shaft 148, and connector plate 166 fixed to the hub flange by rivet 168. Connector plate 166 includes conical bolting flange 170. Hybrid module 200 includes snap ring 172. Shaft 148 includes groove 174, and the snap ring is installed in the groove for axially retaining the hub flange on the shaft.

Hybrid module 200 includes torque converter 202 and adapter plate 238. Torque converter 202 includes drive plate 240 fixed to cover shell 228. Adapter plate 238 is bolted to drive plate 240 and connector plate 166. Adapter plate 238 is bolted to drive plate 240 with circumferentially spaced bolts 242. Adapter plate 238 includes conical bolting flange 244 aligned with conical bolting flange 170. Connector plate 166 includes apertures 172 aligned with circumferentially spaced bolts 242.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Rotor
102 Spring element
104 Axis
106 Rotor carrier
108 Rotor segments

110 End plate (first)
112 End plate (second)
114 Tubular portion
116 Cylindrical surface
118 Radial wall
120 Axial end (first)
122 Axial end (second)
124 Ring portion
126 Segments
128 Notch/circumferential groove (rotor carrier)
130 Hook end (segment)
132 Portion (segment)
134 Notch (spring element)
136 Axial protrusion (second end plate)
138 Annular ring
140 Resolver rotor
142 Axial side (first)
144 Clamping ring
146 Axial side (second)
148 Shaft
150 Flange
152 Rivet (flange to annular ring)
154 Weld (flange to shaft)
156 Spline (first, shaft to damper flange)
158 Spline (second, shaft to drive plate)
160 Drive plate
162 Bore (shaft)
164 Hub flange
166 Connector plate
168 Rivet (connector plate to hub flange)
170 Conical bolting flange (first, connector plate)
172 Apertures (connector plate)
200 Hybrid module
202 Torque converter
204 Damper flange
206 Housing
208 Stator
210 Portion (first, housing)
212 Transmission case
214 Bolt (housing to transmission case)
216 Portion (second, housing)
218 Bolt (housing to combustion engine)
219 Flow passages (first portion)
220 Bolt (first portion to second portion)
221 Sealed chamber
222 Resolver stator
223 Seal (first portion to second portion)
224 Bolt (resolver stator to housing)
226 Pilot (torque converter)
228 Cover shell
230 Bearing (first)
232 Bearing (second)
234 Seal (first)
236 Seal (second)
238 Adapter plate (drive plate to connector plate)
240 Drive plate (torque converter)
242 Bolts (adapter plate to drive plate)
244 Conical bolting flange (adapter plate)

What is claimed is:

1. A rotor for an electric motor, comprising:
an axis;
a rotor carrier comprising:
   a tubular portion with a cylindrical surface; and
   a radial wall extending radially outwardly from the cylindrical surface;
a plurality of rotor segments circumscribing the cylindrical surface;
a first end plate disposed at a first axial end of the plurality of rotor segments adjacent to the radial wall;
a second end plate disposed at a second axial end of the plurality of rotor segments; and
a spring element pressing the first end plate, the plurality of rotor segments, and the second end plate against the radial wall, the spring element comprising a ring portion and a plurality of segments extending axially from the ring portion, wherein at least a portion of each of the plurality of segments is disposed radially inside of the tubular portion.

2. The rotor of claim 1 wherein the spring element contacts the second end plate.

3. The rotor of claim 1 wherein the rotor carrier comprises a notch and each of the plurality of segments comprises a hook end installed in the notch.

4. The rotor of claim 1 wherein the tubular portion comprises a circumferential groove and each of the plurality of segments is clipped into the circumferential groove.

5. The rotor of claim 1 wherein the spring element comprises a notch and the second end plate comprises an axial protrusion extending into the notch.

6. The rotor of claim 1 wherein the rotor carrier comprises an annular ring extending radially inwardly from the tubular portion.

7. The rotor of claim 6 further comprising a resolver rotor fixed to the rotor carrier on a first axial side of the annular ring, wherein the spring element is installed on a second axial side of the annular ring, opposite the first axial side.

8. The rotor of claim 6 further comprising:
a shaft arranged to transmit a torque from a combustion engine to a torque converter; and
a flange fixed to the annular ring and to the shaft.

9. The rotor of claim 8 wherein the shaft comprises a first spline for mating engagement with a damper flange and a second spline for mating engagement with a torque converter drive plate.

10. A hybrid module comprising:
a housing comprising a first portion arranged for fixing to a transmission case and a second portion arranged for fixing to an internal combustion engine;
the rotor of claim 8; and
a stator fixed to the housing and circumscribing the rotor segments.

11. The hybrid module of claim 10 wherein the first portion is bolted to the second portion.

12. The hybrid module of claim 10 further comprising:
a resolver rotor fixed to the rotor carrier; and
a resolver stator fixed to the housing.

13. The hybrid module of claim 10 further comprising a torque converter comprising a pilot fixed to a cover shell, wherein the shaft comprises a bore and the pilot is installed in the bore.

14. The hybrid module of claim 10 further comprising:
a first bearing arranged on a first axial side of the flange radially between the first portion and the shaft; and
a second bearing arranged on a second axial side of the flange, opposite the first axial side, radially between the second portion and the shaft.

15. The hybrid module of claim 14 further comprising:
a first seal arranged on the first axial side of the flange radially between the first portion and the shaft; and
a second seal arranged on the second axial side of the flange radially between the second portion and the shaft.

16. The hybrid module of claim 10 further comprising:
a torque converter drive plate comprising:
  a hub flange drivingly engaged with the shaft; and
  a connector plate fixed to the hub flange and comprising a first conical bolting flange.

17. The hybrid module of claim 16 further comprising a snap ring, wherein:
the shaft comprises a groove; and,
the snap ring is installed in the groove for axially retaining the hub flange on the shaft.

18. The hybrid module of claim 16 further comprising:
a torque converter comprising a drive plate fixed to a cover shell; and
an adapter plate bolted to the drive plate and to the connector plate.

19. The hybrid module of claim 18 wherein:
the adapter plate is bolted to the drive plate with a plurality of circumferentially spaced bolts;
the adapter plate comprises a second conical bolting flange aligned with the first conical bolting flange; and
the connector plate comprises a plurality of apertures aligned with the plurality of circumferentially spaced bolts.

\* \* \* \* \*